Dec. 16, 1952 G. F. DUTTON 2,622,155

MANUFACTURING SOUND RECORD

Filed Nov. 2, 1948

Inventor
GILBERT FARADAY DUTTON
By J. O. Oliver,
Attorney

Patented Dec. 16, 1952 2,622,155

UNITED STATES PATENT OFFICE 2,622,155

MANUFACTURING SOUND RECORD

Gilbert Faraday Dutton, Iver Heath, England, assignor to Electric & Musical Industries Limited, Hayes, England, a company of Great Britain Application November 2, 1948, Serial No. 57,969
In Great Britain November 5, 1947

5 Claims. (Cl. 179—100.2)

This invention relates to apparatus for manufacturing sound records.

It is proposed by the applicant to manufacture magnetic sound records by reproducing electrical signals representative of sounds from an existing magnetic record of said signals and recording said reproduced signals simultaneously in a large number of magnetic record media, this proposal lending itself to the mass production of magnetic sound records. In carrying such a proposal into effect it would be desirable to monitor each record which is manufactured but time and cost considerations would not usually allow each copy to be aurally reproduced in order to monitor it.

The object of the present invention is to provide improved apparatus and for manufacturing sound records with a view to obtaining effective monitoring without the necessity of aurally reproducing the records.

According to one aspect of the present invention there is provided apparatus for manufacturing sound records comprising means for reproducing electrical signals representative of sounds from an existing record of said signals and means for recording said reproduced signals in a record medium, and wherein the apparatus is provided with means for reproducing said electrical signals from said medium and means for utilising said latter reproduced signals to generate a monitoring signal when the signals recorded in said medium differs from the corresponding signals in said existing record.

According to a preferred form of the present invention there is provided apparatus for manufacturing magnetic sound records, comprising means for moving a magnetic record medium comprising an existing record of electrical signals representative of sounds, means for moving a plurality of unmagnetised magnetic record media synchronously with said first record media, an electromagnetic device arranged to reproduce said electrical signals from said first record medium, electromagnetic devices arranged to record said reproduced signals in each of the other record media, electromagnetic devices arranged to reproduce said electrical signals from each of said other media, and a further electromagnetic device arranged to reproduce said electrical signals a second time from said first record medium so that corresponding signals in said last mentioned reproduced signals and in the signals reproduced from said other record media occur at the same time, and means for comparing the signals reproduced from each of said other record media with the signals reproduced the second time from said first record medium so as to generate a monitoring signal when any of said compared signals differ.

Figure 1:
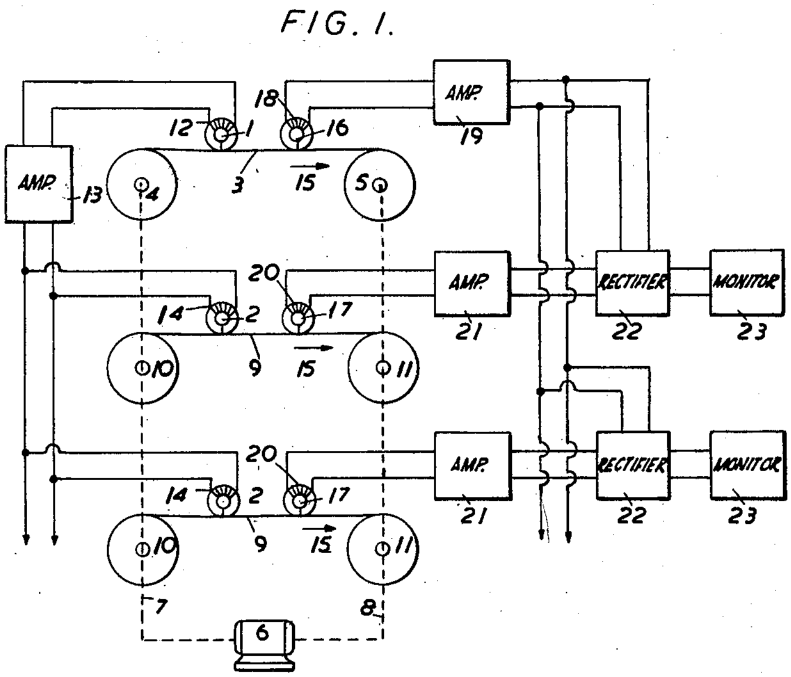
Figure 2:
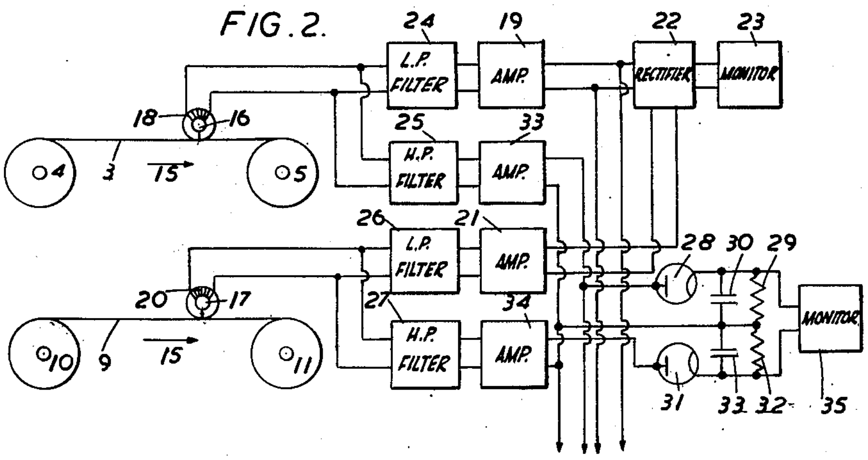

In order that the said invention may be clearly understood and readily carried into effect, the same will now be more fully described with reference to the accompanying drawing, in which:

Figure 1 illustrates diagrammatically and in block form one example of the present invention applied to apparatus for manufacturing magnetic tape sound records, and Figure 2 illustrates a modification of Figure 1.

Referring to the drawing, the apparatus comprises an electromagnetic device 1 constituting a so-called reproducing head such as is commonly employed in magnetic sound reproducing apparatus, and a plurality of electromagnetic devices 2 constituting recording heads. The apparatus also comprises means for guiding and moving a magnetic tape longitudinally past the electromagnetic device 1, and for guiding and moving separate magnetic tapes longitudinally past each of the electromagnetic devices 2. In the drawing a magnetic tape 3 is shown mounted for movement past the electromagnetic device 1, the tape 3 extending between reels 4 and 5 which are arranged to be driven by a motor 6 via suitable transmission means indicated by the dotted lines 7 and 8 so that the tape can be wound from one reel to the other. Similarly, a magnetic tape 9 is mounted for movement past each of the electromagnetic devices 2, each tape 9 extending between reels 10 and 11, which are also arranged to be driven by the motor 6 so that each tape 9 is moved synchronously with the tape 3. The winding 12 of the electromagnetic device 1 is connected across the input of an amplifier 13, the output of which is applied in parallel to the windings 14 of the electromagnetic devices 2. The magnetic tape 3 is magnetised and comprises an existing record of electrical signals representative of the sounds which it requires to record and it is for convenience referred to hereinafter as the master tape. Each tape 9 initially bears no record of electrical signals and is referred to hereinafter as a copy tape. To effect recording in the tapes 9 of the electrical signals recorded in the master tape 3, the latter is moved by the motor 6 past the electromagnetic device 1 in the direction of the arrow 15 and the tapes 9 are simultaneously moved in the same direction past the electromagnetic devices 2. The electrical signals recorded in the tape 3 are reproduced in the winding 12 and, after amplification in the amplifier 13, are applied to the windings 14 whereby said signals are recorded in the tapes 9. For convenience of illustration only two electromagnetic devices 2 are illustrated in the drawing but it will be understood that a large number are provided in the apparatus so that a large number of magnetic tape-records can be simultaneously manufactured.

In addition to the electromagnetic devices 1 and 2 a further electromagnetic device 16 constituting a reproducing head cooperates with the tape 3, and a further reproducing electromagnetic device 17 co-operates with each of the tapes 9. The electromagnetic device 16 is disposed so that when the tape 3 is moved in the direction of the arrow 15 each element of the tape 3 moves past the electromagnetic device 16 after passing the electromagnetic device 1, and the electromagnetic devices 17 are disposed so that the distance between each electromagnetic device 17 and the corresponding electromagnetic device 2 is equal to the distance between the electromagnetic devices 1 and 16. Therefore, when recording in the tapes 9 is in progress, the electrical signals reproduced by the electromagnetic device 1 are reproduced a second time by the electromagnetic device 16, and the signals recorded by each electromagnetic device 2 are reproduced by the corresponding electromagnetic device 17 so that corresponding signals reproduced by the electromagnetic devices 16 and 17 occur at the same time. The winding 18 of the electromagnetic device 16 is connected across the input of an amplifier 19 while the winding 20 of each of the electromagnetic devices 17 is connected across the input of a separate amplifier 21. The output of the amplifier 19 is applied in parallel to the input of a number of rectifiers 22, one corresponding to each electromagnetic device 17, and the output of each amplifier 21 is also applied to the input of the corresponding rectifier 22. The amplifiers 19 and 21 are such that if the electrical signals reproduced from the tape 3 by the electromagnetic device 16 are identical in amplitude and phase with the electrical signals reproduced from the tape 9 by the respective electromagnetic devices 17, the input to each rectifier 22 from the amplifier 19 is effectively equal to, but in phase opposition to, the input to the rectifier 22 from the respective amplifier 21, the output from each rectifier 22 being proportional to the difference between the input signals and being zero when the input signals are equal. The output circuit of each rectifier 22 is connected to a monitoring device 23 which is arranged to give an audible or visible signal when an appreciable signal appears in the output circuit of the corresponding rectifier 22. Each monitoring device therefore gives warning if the signals recorded in the corresponding copy tape 9 differ substantially from those recorded in the master tape 3, due for example to amplitude or phase distortion introduced by the recording circuit or to phase distortion due to relative variations in the rate of movement of the tapes 3 and 9.

In the form of the invention illustrated in Figure 1 difficulty may be encountered in avoiding slight relative differences in the positions of the electromagnetic devices 16 and 17, and even a slight difference may be sufficient to cause a substantial phase shift between the high frequency components of the signals reproduced by the electromagnetic devices 16 and 17. Figure 2 illustrates a modification of Figure 1 which reduces this difficulty, corresponding parts of Figures 1 and 2 being denoted by the same reference numerals. In the interests of simplicity some parts of Figure 2, which are the same as in Figure 1, have been omitted and only one copy tape 9, with its associated electromagnetic device 17 and monitoring circuit has been shown. According to Figure 2, electrical signals from the winding 18 of the electromagnetic device 16 are applied in parallel to a low pass filter 24 and to a high pass filter 25, while the electrical signals from the winding 20 of each electromagnetic device 17 are also applied in parallel to a low pass filter 26 and a high pass filter 27. The upper cut-off frequency of the filters 24 and 26 is arranged to be the same as the lower cut-off frequency of the filters 25 and 27 and this frequency is preferably about 1,000 cycles per second. The outputs of the low pass filter 24 and each of the low pass filters 26 are compared by means of amplifiers 19 and 21 and a rectifier 22 as described in Figure 1 and any substantial difference in amplitude or phase between the compared low frequency components is instrumental in causing the corresponding monitoring device 23 to give an alarm. The comparison of the low frequency components serves to detect relative variations in the speed of the tapes 3 and 9 and also amplitude and phase distortions of the low frequency components introduced by the recording circuit. To each high pass filter 27 there corresponds a pair of similar but differentially arranged rectifying circuits, one circuit comprising a diode valve 28, resistance 29 and a condenser 30, and the other circuit comprising a diode valve 31, resistance 32 and a condenser 33. The output of the high pass filter 25 is fed via an amplifier 33 to each of the rectifying circuits 28, 29, 30 (only one of which is however shown in the drawing) while the output of each high pass filter 27 is fed via an amplifier 34 to the corresponding rectifying circuit 31, 32, 33, so that the potentials set up across the resistances 29 and 32 in each pair of rectifying circuits corresponds to the envelope shapes of the high frequency components in the respective signals fed to the high pass filter 25 and the corresponding high pass filter 27. The amplifiers 33 and 34 are moreover such that the potentials set up respectively across resistances 29 and 32 in each pair of rectifying circuits are equal if said envelope shapes are equal and since said resistances are differentially connected in series there will be a resultant potential across the resistances in series only when said envelope shapes differ. The resistances 29 and 32 are connected as shown to the input of a monitoring device 35 which may be similar to the device 23, the monitoring device 35 serving to give an alarm when any substantial difference in envelope shapes as aforesaid occurs. Neither of the monitoring devices 23 and 35 is therefore affected by the phase differences in the high frequency components.

What I claim is:

1. Apparatus for manufacturing magnetic sound records, comprising means for continuously tracking a magnetic record medium bearing an existing record of sound signals, first and second electromagnetic signal-reproducing devices arranged sequentially along the track of said record medium, means for continuously tracking at least one further magnetic sound record medium in synchronism with said first record medium, an electromagnetic signal-recording device and a third electromagnetic signal-reproducing device arranged sequentially along the track of said second record medium with the same separation as that between said first and second reproducing devices, means for feeding electrical signals from said first reproducing device to said recording device, means for dividing electrical signals from said second reproducing device into components of relatively low frequency and components of relatively high frequency, means for similarly dividing electrical signals from said third reproducing device into components of relatively low frequency and components of relatively high frequency, means for comparing said first and second mentioned low frequency components, means responsive to a substantial difference between said low frequency components for generating a monitoring signal, means for respectively generating the envelope shapes of said first and second mentioned high frequency components, means for comparing said envelope shapes, and further means responsive to a substantial difference between said compared envelope shapes for generating a monitoring signal.

2. Apparatus for manufacturing magnetic records, comprising means for reproducing two sets of electrical signals from an existing record of said signals, a plurality of electromagnetic means for recording one of said sets of electrical signals simultaneously in a plurality of magnetic record media to produce a plurality of copies of said existing record, a plurality of electromagnetic means for reproducing the recorded electrical signals from the respective copies, means for separately comparing the reproduced signals from each copy with the second-mentioned set of electrical signals, and means responsive to differences in the compared signals for generating monitoring signals.

3. Apparatus for manufacturing magnetic sound records, comprising first and second electromagnetic signal-reproducing devices with a predetermined separation between said devices, means for moving a magnetic record medium bearing an existing magnetic record of sound signals past said devices in succession to generate two sets of electrical signals representative of said sound signals, a plurality of electromagnetic recording devices and a plurality of further electromagnetic reproducing devices, one corresponding to each recording device, means for feeding the electrical signals generated by said first reproducing device to the recording devices in parallel, means for similarly moving a plurality of magnetic record media to pass each of said record media past one of said recording devices and the corresponding further reproducing device in succession to produce a copy of said existing record in the respective record medium, the signals recorded in each copy being reproduced by the corresponding reproducing device, means for separately comparing the signals reproduced from each copy with the signals generated by the second reproducing device, and means responsive to differences in the compared signals to generate monitoring signals, each further reproducing device being spaced from the corresponding recording device to produce effective synchronism between the signals reproduced from each copy and the signals generated by the second reproducing device.

4. Apparatus for manufacturing magnetic records, comprising means for reproducing two sets of electrical signals from an existing record of said signals, a plurality of electromagnetic means for recording one of said sets of electrical signals simultaneously in a plurality of magnetic record media to produce a plurality of copies of said existing record, a plurality of electromagnetic means for reproducing recorded electrical signals from the respective copies, means for modifying said second set of electrical signals to remove relatively high frequency variations therefrom, means for similarly modifying the reproduced signals from each copy, means for separately comparing the modified reproduced signals from each copy with the modified second set of signals, and means responsive to differences in the compared signals for generating monitoring signals.

5. Apparatus for manufacturing magnetic sound records, comprising duplicate electromagnetic signal-reproducing devices, means for moving a flexible elongated magnetic record medium bearing an existing magnetic record of sound signals past said devices in succession to generate two sets of electrical signals representative of said sound signals, a plurality of electromagnetic recording devices and a plurality of further electromagnetic reproducing devices, one corresponding to each recording device, means for feeding said first set of electrical signals in parallel to said recording devices, means for similarly moving a plurality of flexible elongated magnetic record media to pass each of said media past one of said recording devices and the corresponding further producing device in succession to produce a plurality of copies of said existing record, the electrical signals recorded in each copy being reproduced by the corresponding further reproducing device, each further reproducing device being spaced from the corresponding recording device to produce effective synchronism between signals reproduced from each copy and said second set of signals, means for suppressing relatively high frequency variations in said second set of signals to modify them, means for similarly modifying signals reproduced from each copy, means for separately comparing modified signals reproduced from each copy with the modified second set of signals, and means responsive to differences in the compared signals to generate a monitoring signal.

GILBERT FARADAY DUTTON.

REFERENCES CITED

The following references are of record in the file of this patent:

UNITED STATES PATENTS

| Number | Name | Date |
|---|---|---|
| 1,974,911 | Buecker | Sept. 25, 1934 |
| 2,117,052 | Bailey | May 10, 1938 |
| 2,251,828 | Hammond | Aug. 5, 1941 |
| 2,503,925 | Tinkham | Apr. 11, 1950 |
| 2,530,562 | Blaney | Nov. 21, 1950 |